(12) United States Patent
Wight et al.

(10) Patent No.: US 7,750,498 B2
(45) Date of Patent: Jul. 6, 2010

(54) ADAPTIVE PEAK POWER MANAGEMENT OF LOAD DEVICES SHARING A POWER SOURCE

(75) Inventors: Bruce A. Wight, Fort Wayne, IN (US); James Kroeger, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 417 days.

(21) Appl. No.: 11/858,205

(22) Filed: Sep. 20, 2007

(65) Prior Publication Data
US 2008/0073975 A1  Mar. 27, 2008

Related U.S. Application Data

(60) Provisional application No. 60/846,364, filed on Sep. 22, 2006.

(51) Int. Cl.
*H02J 1/10* (2006.01)
(52) U.S. Cl. ....................................................... 307/20
(58) Field of Classification Search .................... 307/20
See application file for complete search history.

(56) References Cited

U.S. PATENT DOCUMENTS 4,631,496 A    12/1986  Borras et al.
5,754,445 A *  5/1998  Jouper et al. ................. 700/295
6,081,733 A    6/2000  Hietala et al.
6,459,175 B1   10/2002 Potega
2005/0278559 A1 12/2005 Sutardja et al.

OTHER PUBLICATIONS

Examiner's First Report in counterpart Australian Application No. 2007216911, dated Jun. 10, 2009.

* cited by examiner

*Primary Examiner*—Robert L. Deberadinis
(74) *Attorney, Agent, or Firm*—Edell, Shapiro & Finnan, LLC

(57) ABSTRACT

An adaptive power management system includes a number of load devices, including a burst load device operable with a time-varying load having a controllable duty cycle. A shared power source supplies power to the load devices. The system adaptively determines a power allocation for the burst load device based on operational requirements of the load devices, and the maximum power supplied to the burst load device is limited to a selected power level based on the determined power allocation. A power storage module stores power supplied by the shared power source and supplies sufficient power to permit the burst load device to operate during burst periods with a peak power that exceeds the average power supplied to the power storage module. The duty cycle of the burst periods of the burst load device is controlled to maintain the power stored by the power storage module above a desired level.

24 Claims, 4 Drawing Sheets

ADAPTIVE PEAK POWER MANAGEMENT OF LOAD DEVICES SHARING A POWER SOURCE

CROSS REFERENCE TO RELATED APPLICATIONS

This application claims priority under 35 U.S.C. §119(e) from U.S. Provisional Patent Application Ser. No. 60/846,364, filed Sep. 22, 2006, and entitled "Expansion Module for Enhancing Operation of a Legacy Communication Device," the entire contents of which are hereby incorporated by reference.

BACKGROUND

In equipment having at least two load devices (e.g., plural modules, units, or subsystems) that require electrical power, a shared power source that supplies power to these devices or subsystems is typically designed to meet the worst case loads of all supported equipment with some margin. However, designing the shared power source for the combined peak power requirements of all of the supported equipment results in increases in size and cost of the power supply and reduces power supply efficiency under average loads which may more commonly occur during operation. Such an approach does not take advantage of load leveling when average loads are much lower than peak loads.

Recent advances in technology, such as aerogel-based supercapacitors, have allowed newer systems to be designed for average power instead of worst-case peak power. However, present shared power schemes still have a number of limitations. For example, the power requirements of any individual load device supported by the shared power subsystem may vary over time by an order of magnitude or more depending on the operating state of the equipment. Shared power subsystems are generally not designed to take advantage of such varying load conditions imposed by the supported equipment or to manage or coordinate the collective time-varying power requirements of the supported equipment.

A power supply module or subsystem originally designed to support certain equipment subsequently may be required to additionally support new modules or equipment that augments or enhances the original equipment. If it is desirable not to modify or redesign the power subsystem, supporting this additional equipment may put a strain on the available power resources, since there will be some upper limit on the current the power subsystem can supply.

For example, legacy communication equipment lacking some of the capabilities of expected of future software defined radios or radios conforming to the U.S. government's Software Communication Architecture, can be greatly enhanced by attaching a separate module which is compatible with the legacy equipment and provides many of the more advanced capabilities and flexibility of a software defined radio. Preferably, such an expansion module would connect to an existing or legacy communication device in such a manner that the module provides additional capabilities to the existing device without the need for wholesale removal and exchange of the existing device with a new device. To make retrofitting of legacy equipment cost effective, it is desirable minimize modifications to the original equipment, including the power subsystem. In such situations, consideration must be made as to how to share among multiple subsystems a limited amount of power originally expected to support fewer components, while still meeting the power requirements of each subsystem.

More generally, it would be desirable to provide a scheme which manages and coordinates usage of a shared power source among a plurality of load devices, some of which may have time-varying power requirements and/or a controllable duty cycle, in a manner that minimizes the average power requirements of the shared power source.

SUMMARY

According to the present invention, an adaptive power management system comprises a number of load devices, including at least one burst load device operable with a time-varying load having a controllable duty cycle. A shared power source supplies power to the load devices. The system adaptively determines a power allocation for the burst load device based on operational requirements of the load devices. The maximum power supplied to the burst load device is limited to a selected power level based on the determined power allocation. Thus, for example, a multi-level power limiter can be set to a particular level that limits the average power that can be drawn to operate an associated burst load device to a specific maximum value. A power storage module stores power supplied to the burst load device by the shared power source and supplies sufficient power to the burst load device to permit operation during burst periods with a peak power that exceeds the average power supplied to the power storage module. The duty cycle of the burst periods of the burst load device is controlled to maintain an acceptable power storage level, e.g., to prevent the power stored by the power storage module from being exhausted.

The power storage module can be configured to monitor its power storage level to provide an indication or "state" of a currently remaining amount of power. The power manager can control the duty cycle of the burst load device based on the state of the power storage level in the power storage module to ensure that an acceptable power storage level is maintained. For instance, if insufficient power is available, the power manager can reduce the duration or frequency of burst periods during which the burst load device operates. Depending on the application, the power manager may also be able to reduce the peak power level used by the burst load device. The power manager can also take into account the power allocation or the selected power limit for the burst load device in selecting the duty cycle (e.g., to select an initial duty cycle).

The power manager can be configured in any of a variety of ways. For example, each load device may be embodied in a load device module that includes a power storage device, a power limiter, and a local power manager that communicates with a system-wide power arbiter and/or with power managers of other load devices. Optionally, power management and/or the power limiting operations can be centralized in a system power controller which communicates and distributes power to each load device module.

Using the shared power management scheme of the present invention, with judicious control of duty cycle, power limiting and storage, the maximum average power that the shared power source is capable of supplying can be far less than the sum of peak powers required to operate each of the load devices. In this manner, a lower current, more efficient, and cost effective power source can be used. In the case of a legacy or pre-existing device, the invention permits the limited power resources of the power source of the legacy device to be adapted to support expansion modules or equipment without enhancement of the power source.

The above and still further features and advantages of the present invention will become apparent upon consideration of the following detailed description of a specific embodiment

DETAILED DESCRIPTION

The power sharing management scheme described herein provides adaptive power limits based on shared loads and peak power management techniques. Adaptive power management is achieved by providing multi-level local power management, thereby limiting the load imposed on the shared power subsystem by individual load devices. Each load device in the system can be equipped with a local power storage and distribution capability that permits the load device to operate during burst periods at a peak power that is greater than the average power to which the load device is limited. The load device can monitor its present power requirements and communicate the state of its power reserve to a management or control system. Management of peak power allows high burst power applications while reducing the peak load on the shared power subsystem to much a lower limit. Average power load management is achieved by limiting high burst rate time periods or the burst period repetition rate in response to varying external load conditions.

Figure 1:
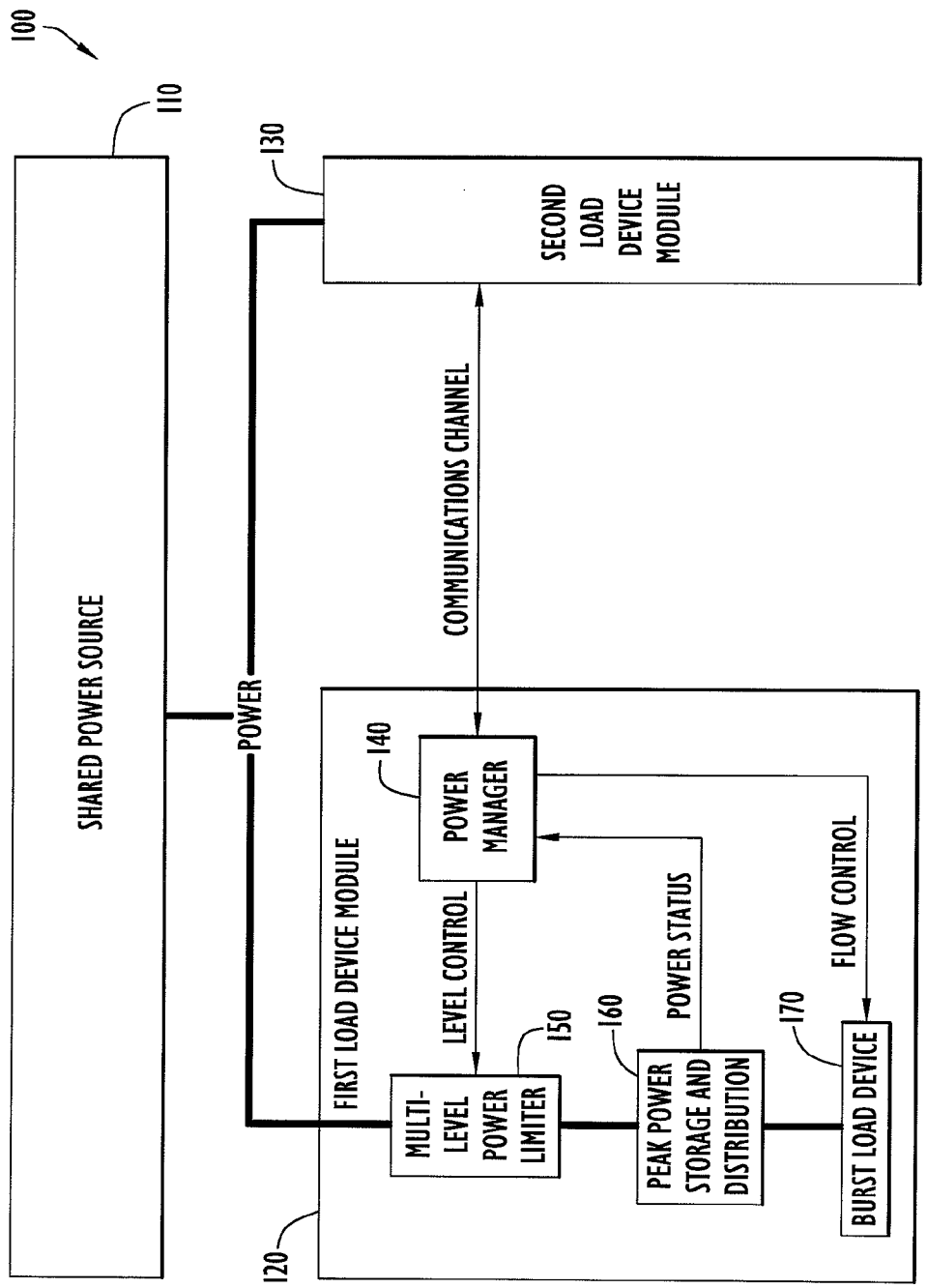
FIG. 1 is a functional block diagram illustrating a shared power management system in accordance with an exemplary embodiment of the present invention.

FIG. 1 is a block diagram which functionally illustrates a shared power management system 100 in accordance with an exemplary embodiment of the present invention. A shared power source 110 supplies power to a plurality of load devices, including at least a first load device module 120 and a second load device module 130. While only two load device modules are shown in FIG. 1, it will be understood that any practical number of load devices can be supported by the shared power source, depending on the particular device or application involved.

The shared power management system of the present invention can be incorporated into virtually any electronic device, equipment, or assembly of systems or subsystems in which a power source is shared among a number of components. By way of example, the shared power management system can be implemented in a communication device capable of transmitting and/or receiving signals, including but not limited to: a fixed-position or mobile RF transmitter, a handheld or body-mounted radio; any type of wireless telephone (e.g., analog cellular, digital cellular, or satellite-based); a pager or beeper device; a PDA; a radio carried on, built into or embedded in a ground-based or airborne vehicle; a satellite-mounted transmitter or receiver; any electronic device equipped with wireless transmission capabilities, including multimedia terminals capable of transmitting audio, video and data information; devices used in ground-based, airborne and/or space-based navigation (e.g., GPS-related devices); radar devices; and devices capable of performing communication and navigation operations. The shared power management system of the present invention can also be incorporated into other types of equipment, including electronic toys, power generation and supply systems, battery operated devices, computer equipment, automotive and avionic electronics, emergency power and power backup systems. The foregoing list of examples is not intended to be exhaustive but merely exemplary of the type of equipment and devices that can employ the shared power management system of the invention.

The invention is particularly useful in devices and equipment in which more than one power load is supported by a shared power source, and the power requirements of at least some of the load devices can vary over time, the load devices have a controllable duty cycle, or the load devices can be operated in different modes that have different power requirements.

Referring again to FIG. 1, shared power source 110 can be virtually any type of power source. In one exemplary embodiment, the shared power source is a subsystem of a device or assembly and capable of supplying a specified maximum amount of power, e.g., there is a limit to the amount of current that can be drawn from the shared power source. The shared power source can be, for example, part of a legacy system originally designed to support certain subsystems, where newly added expansion subsystems are subsequently expected to be supported by the legacy power source. Alternatively, the shared power source can be designed as part of a new system or device having more than one load device.

The thicker power line shown in FIG. 1 denotes that path of the power supplied by the shared power source to the load device modules. The available power (current and voltage) provided by the shared power source 110 is typically limited in terms of peak capability. Considering the peak power requirements of each the load devices, it may be the case that the sum of the peak power requirements of the load devices exceeds the peak power capability of the shared power source. Nevertheless, because at least some of the load devices operate in a burst mode (e.g., periodically or intermittently), peak power is drawn by the load device for only some fraction of the time. Importantly, however, the sum of the average powers drawn by the load devices cannot exceed the maximum power capability of the shared power source, as explained below in greater detail.

The first load device module 120 shown in FIG. 1 includes a power manager 140, a multi-level power limiter 150, a peak power storage and distribution module 160, and a burst load device 170. While not shown in FIG. 1, second load device module 130 may also include these components, particularly if second load device module 130 includes a burst load device with time-varying power requirements. On the other hand, if the power requirements of second load device module 130 always take priority over those of first load device module 120 or if second load device module 130 is part of a legacy device, it may lack some of the components of first load device module 120. Note that shared power source 110 may also support load devices that do not have time-varying load requirements or do not have a controllable duty cycle. In this case, such load devices need not be embodied in a load device module with the components shown for first load device module 120 in FIG. 1.

In the embodiment shown in FIG. 1, power manager 140 is a component of first load device module and provides local management of the power consumed by burst load device 170, including monitoring and adaptive control. Power manager 140 is coupled to other load devices and/or to a central power controller or arbiter (not shown in FIG. 1) via a communications channel. The communication channel may comprise any type of communication link (e.g., discrete lines, or serial communications) depending on the implementation. The power manager is responsible for adaptively determining a power allocation for the first load device module based on operational requirements of the various load devices, taking into consideration, for example, the present power usage states of the load devices, the priority of certain load devices, or certain operations being performed or schedule to be performed by certain load devices.

The power allocated to first load device module 120 can be specified in terms of an average power. This is because the overall system is inherently constrained such that the average power allocated to the set of load devices cannot exceed the average power available from the power source. Thus, power manager 140 of first load device module 120 must coordinate in some manner with the requirements of the other load devices to determine a suitable maximum average power level for the first load device module. The decision logic for determining the suitable power allocation for the load devices can be distributed among respective local power managers, which share information about scheduled operations, power requirements, relative priority of operations, etc., and adaptively adjust their power allocations to stay within the overall maximum average power available from the shared power source 110. Optionally, some portion or all of the decision logic determining power allocations can be made by a centralized arbiter (e.g., part of a management system for the system as a whole), which then communicates with the local power managers. In this case, the local power managers may have a more limited role in determining the power allocations among the load devices but may still communicate power requirement and status information from the local load device to the central arbiter or controller.

Power manager 140 adaptively determines the power allocation for first load device module on an ongoing basis, such that the power allocation can be adjusted as operating conditions are requirements fluctuate. The determination of the power allocation can be performed periodically, or power manager 140 can operate on an interrupt basis in response to operating or scheduled events, resulting in intermittent modifications to the power allocation. For example, a higher priority load device module may include a transmitter, which would typically be a relatively high-power load. If this higher priority transmitter begins operating with a high duty cycle, power manager 140 may respond by reducing the power allocation to first load device module 120, resulting in interrupt commands which reduce the power consumption of burst load device 170.

More generally, the power manager addresses adaptive maximum load management for the local burst load device based on shared power status information. In the implementation shown in FIG. 1, maximum load management is achieved by power manager 140 controlling the multi-level power limiter 150. Specifically, multi-level power limiter 150 is coupled by the power line to shared power source 110 and has a plurality of N selectable power levels to which the output power can be limited, thereby limiting the total maximum load presented to the shared power source to one of N selectable levels. Preferably, power limiter 150 limits power in terms of average power, such that the selected power level represents a limit on the maximum average power that can be drawn by first load device module 120, i.e., the power limiter limits the rate at which power can be drawn from the shared power source. As indicated in FIG. 1, power manager 140 supplies a level control signal to power limiter 150 to select an appropriate power level based on the determined power allocation for first load device module 120. As the power allocation changes based on operational requirements of the various load devices, power manager 140 can appropriate modify the limit on the average power drawn by load device module 140 by changing the level control used to select the power level of power limiter 150. Since the power limiters of the various load devices limit power on the basis of average power, by appropriately setting the limits of the power limiters, the operating constraint of keeping the sum of the average powers drawn by the load devices at or below the average power capacity of the shared power source can be met with assurance.

Referring once again to FIG. 1, peak power storage and distribution module 160 provides the power storage used to support the peak power required to operate burst load device 170 during burst periods. Specifically, module 160 receives and stores the output power from power limiter 150 (i.e., the power from shared power source 110 which is constrained not to exceed the specified average power level setting of power limiter 120). The power can be stored in any type of power storage device suitable for the particular equipment or application, including but not limited to any type of rechargeable battery device or capacitor. For example, if the burst load device is a transmitter, aerogel-based supercapacitors may be suitable power storage devices, since these devices can support high peak power operation for a limited time and duty cycle. Module 160 further includes charge management, voltage conversion, and power distribution capabilities, suitable for controlling charging of the storage device(s), generating the voltage levels necessary for operating burst load device 140 during peak power operation, and distribution of power to burst load device 170.

Local storage of power in this manner permits burst load device 170 to operate for limited periods of time at a peak power that exceeds the average power level allocated to the burst load device 170. Specifically, burst load device 170 may have periods of operation called burst periods in which a high peak power is required to operate. These burst periods may be periodic, intermittent, or sporadic, and are interspersed with periods in which less or essentially no power is required. The duty cycle of a load device with burst operation is essentially the fraction or percentage of time that the load device is operating in a peak or high power mode. Thus, for example, if a transmitter transmits signals with a particular repetition rate, if the duration of each transmission is increased, the duty cycle is increased. Likewise, if the repetition rate of transmission of signals of a certain duration is increased, the duty cycle increases. Conversely, sending shorter transmissions or increasing the time between transmissions will reduce the duty cycle.

The duty cycle and peak power have an important relationship with the average power supplied to the burst load device. In particular, the overall power used by the burst load device 170 over time must be less than the average power supplied to the peak power storage and distribution module 160 in order to keep an acceptable level of power reserve in module 160 and to prevent exhaustion of the power stored therein. In graphical terms, if one considers a plot of power level versus time for the burst load device, the "area under the curve" of the plot cannot exceed the area under the curve of the plot of the average power level versus time (which would be a straight horizontal line in the case where power is being drawn at the limit set by the power limiter). Thus, local storage of power in capacitors, batteries, or the like permits the burst load device to drawn more power during burst periods than the average power being supplied to the burst load device, provided the duty cycle and peak power to average power relationships are kept in balance.

Referring again to FIG. 1, peak power storage and distribution module 160 can further include the capability to perform stored power level status monitoring and reporting. In the case of a capacitor (or battery), module 160 can report on the present charge state of the capacitor in terms of a charge level, a trend (i.e., charge is diminishing or increasing), or in terms of capability to support required operations of burst load device 170. For example, module 160 can report three states: 1) fully capable of supporting power requirements; 2) capable but power reserves are diminished or diminishing; and 3) power reserves are run down and operation of the burst load device needs to be cut back or stopped. Similarly, module 160 could simply indicate a charge level states of full, middle-level, or end of charge. This monitoring can be accomplished using comparators with trip points, for example.

Power status information can be supplied by peak power storage and distribution module 160 to power manager 140, as shown in FIG. 1, to permit power manager 140 to adaptively control the duty cycle of burst load device 170, as indicated by the flow control signal line in FIG. 1. For example, if the power status indicates that the stored charge level is low, power manager 140 can control the duty cycle of burst load device 170 until the stored charge level (power reserve) reaches an acceptable level. Duty cycle can be controlled by adjusting the duration or repetition rate (or both) of burst periods. In this manner, the duty cycle can be controlled as a function of power available to prevent the stored power from being exhausted and avoid an uncontrolled failure of the burst load device. Thus, power manager 140 can provide average input power management through burst load device duty cycle control.

Depending on the particular type of burst load device, another option for controlling the power consumption of the burst load device may be to control the peak power level. As with adjusting duty cycle, the average power consumption can be decreased by reducing the peak power level of the burst load device in response to an unacceptable power storage level or state. In some equipment, a combination of duty cycle and peak power can be controlled to maintain an acceptable overall average power consumption that is consistent with the maximum average power limit imposed by power limiter 150 and/or the power level status reported by peak power storage and distribution module 160.

As described above, power manager 140 is responsible for determining the power allocation for first load device module 120 and selecting the appropriate level control form power limiter 150. This information can also be used by power manager 140 to select an appropriate duty cycle or peak power level for burst load device 170 (instead of or in addition to the power status information). Again, knowing the average power available to burst load device 170, power manager can determine the suitable duty cycle and peak power that will keep the overall power usage of burst load device 170 within this average power limit.

One specific example of a shared power system is a legacy radio (e.g., a two way communication device) having a power subsystem that is required to support both the legacy radio as well as an expansion module that draws power from the legal power subsystem. The expansion module may include a burst load device such as a transmitter/receiver that operates in different modes from the legacy radio. The expansion module can be suitably configured to mechanically and electrically connect with any communication and/or other electronic device in the manner described below so as to facilitate electrical connection and/or communication between the expansion module and the legacy equipment which it is connected and enhanced performance and operability of such device. Thus, the expansion module is configured to mount to the legacy radio and shares the conditioned DC power source used by the legacy radio.

In this example, periods during which the RF transmitter is transmitting would be considered a burst period, since transmission consumes significant current and hence power. In many applications, the RF transmitter subsystem transmits a burst (packet) of user data such as an IP datagram. The subsystem would also include the packet source where packet flow control can be imposed by the power manager to reduce average power consumption by controlling the rate at which power bursts are generated.

If field programmable gate arrays (FPGAs), which require considerable current, are used to implement the transmitter device, the ratio of the peak-to-average power can be on the order of 3/1 to 5/1, for example, thereby requiring significant power storage and management. Supercapacitors are useful in this context, because they can discharge at a relatively high power level for periods on the order of one second with a low level of re-supply, which is generally sufficient relative to the burst periods involved in packet transmission, which can be on the order of tens of milliseconds or less.

Continuing with the example of a transmitter/receive subsystem, in response to an indication of a dropping power status or a more restrictive power allocation, the power manager will try to gradually reduce operation or start shutting down the transmitter to achieve a graceful degradation in performance or a graceful shut down. Thus, for example, the transmitter could be controlled to slow down the message delivery rate (i.e., a reduction in duty cycle), and temporarily allow message queues to build up until a higher power level is available to the transmitter. Eventually, if more power does not become available, message queues will overflow or time-critical packets will become too stale to transmit, and performance will suffer. However, the burst load device or the power manager can include logic for scheduling and prioritizing message delivery to minimize degradation. For example, audio transmissions are time critical but may require only about 2 ms out of every 100 ms to support a voice signal. Data packets are less time sensitive, but may require 2-8 milliseconds per packet for transmission. Video streaming, on the other hand, can be time critical and may require a much higher duty cycle (e.g., 80 ms out of every 100 ms). Taking into consideration such requirements, decision logic can be used to prioritize which packets will be transmitted with a reduced transmitter availability.

The foregoing is just one specific example of a burst load device, and it will be appreciated that the burst load device can be virtually any device that draws current for operation and has time-varying power requirements or uses power in bursts with controllable a duty cycle or peak power. The burst load device, for example, can be a manager of multiple devices or a distributed device with multiple points at which the power load is controllable.

As will be appreciated from the foregoing, the shared power management scheme of the present invention is particularly applicable to shared power systems where it is necessary or advantageous to limit total power usage to reduce size or cost, but where it is required to supply output power bursts. Note that one of the primary issues addressed by the invention is to stay within the average power capabilities of a shared power source. This differs from many applications that employ supercapacitors, which are primarily concerned with battery life issues and minimizing battery power usage.

Figure 2:
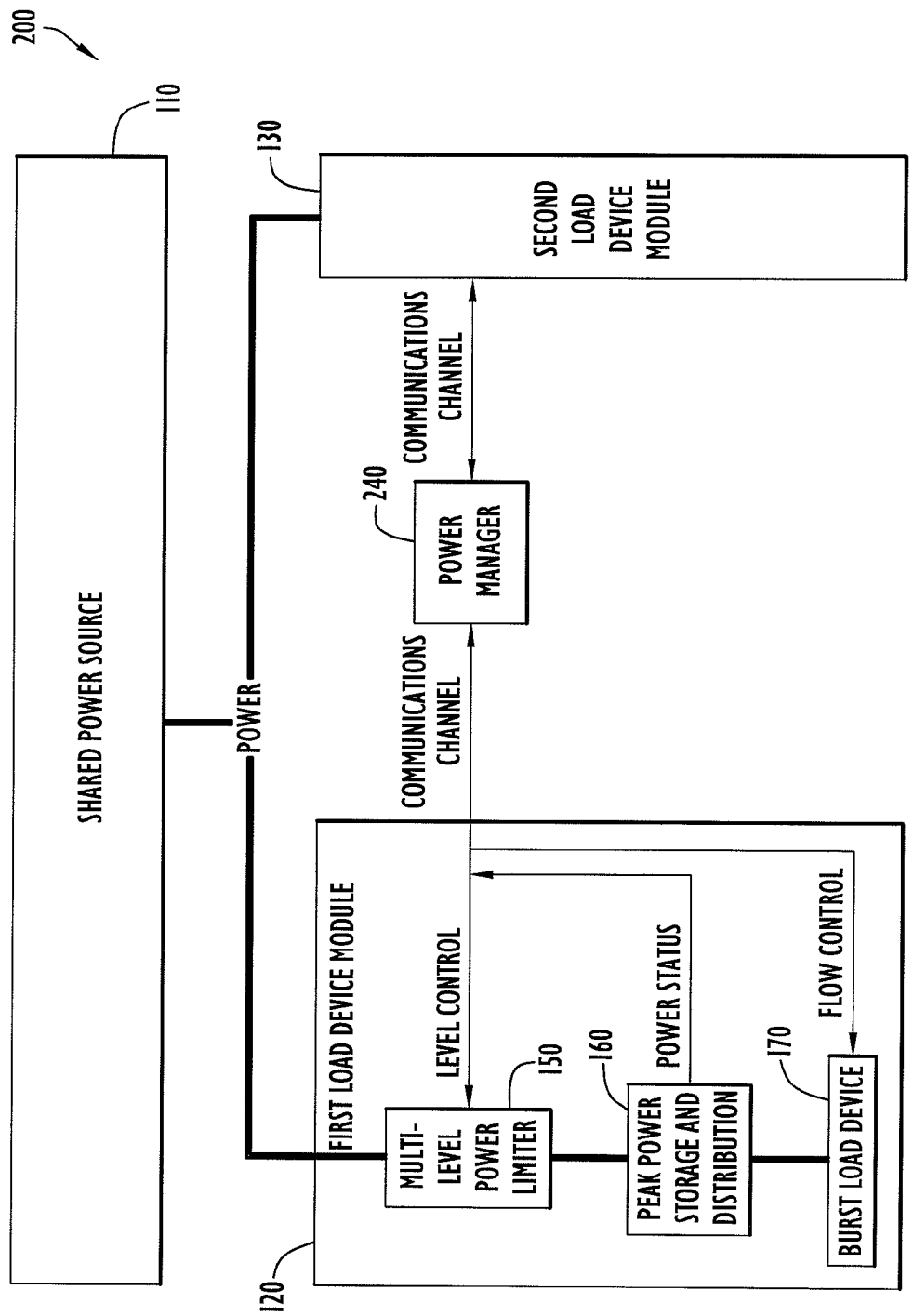
FIG. 2 is a functional block diagram illustrating a shared power management system in accordance with another exemplary embodiment of the present invention.
Figure 3:
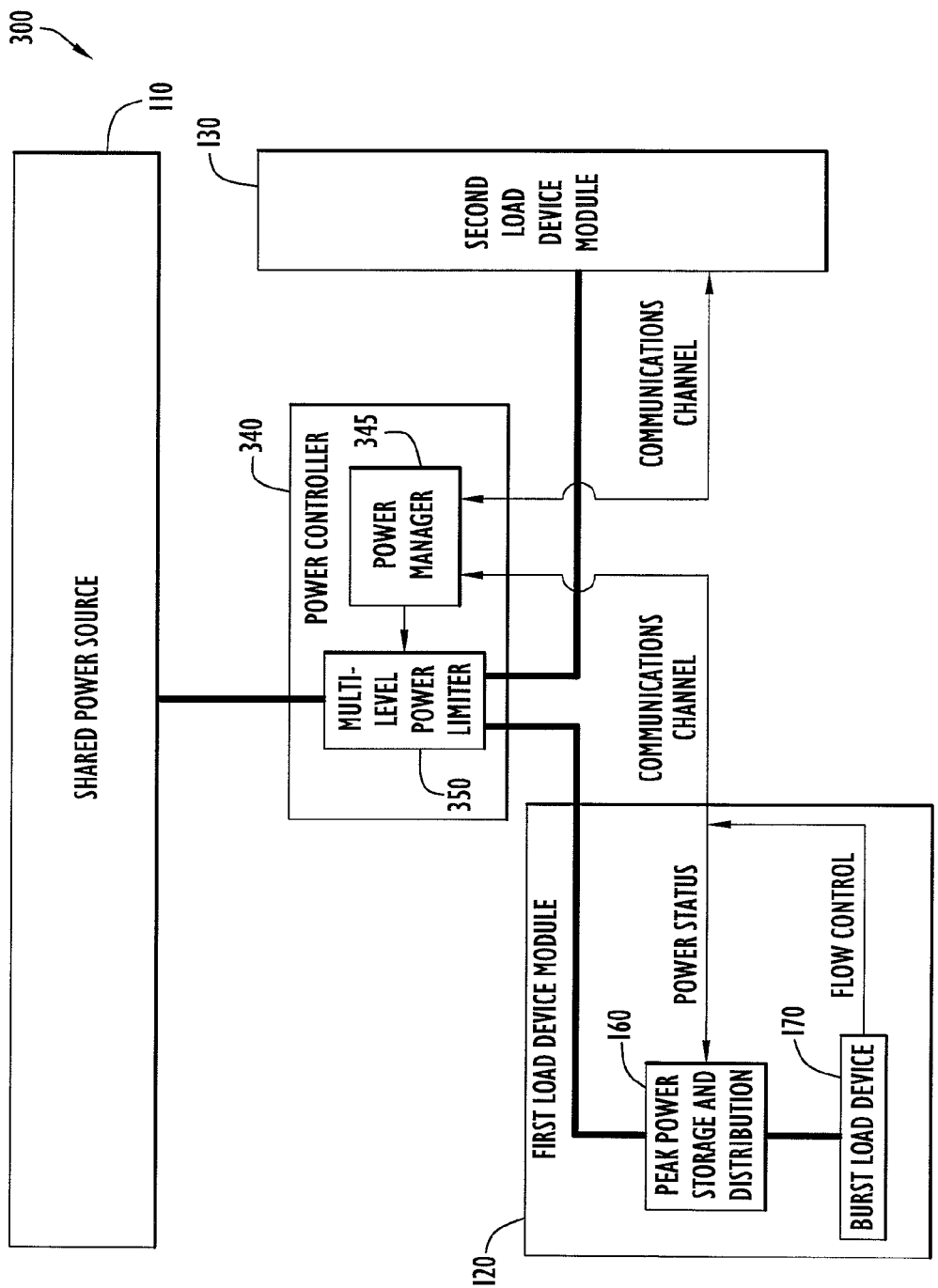
FIG. 3 is a functional block diagram illustrating a shared power management system in accordance with another exemplary embodiment of the present invention.

FIGS. 2 and 3 are block diagrams illustrating other embodiments, and clarify that the invention is not limited to the particular architecture shown in FIG. 1. In FIG. 2, for example, the power manager 240 is embodied in a central module rather than a group of distributed modules contained within the load device modules. In this case, the power manager can be part of an overall device operating/control system and arbitrates among the load devices to assign power allocations. As shown in FIG. 2, power manager 240 can be coupled to each of the load device modules by a communications channel, such as a bus, for transmitting and receiving the level control, power status, and flow control signals described above.

FIG. 3 illustrates yet another embodiment in which the power limiting operation can be performed by a centralized multi-level power limiter 350 which resides in a main power controller 340 containing the centralized power manager 345. In this case, shared power source 110 supplies the power to power controller 340, which distributes the power via power limiter 350 to the various load device modules. Referring back to FIG. 1, while shown as separate functional blocks for purposes of description, the power limiter 150 and power manager 140 also can be jointly considered as a power controller in this context and need not be configured as separate physical modules. As will be appreciated from the foregoing exemplary embodiments, a wide variety of architectures can be used to perform the shared power management scheme of the present invention.

Figure 4:
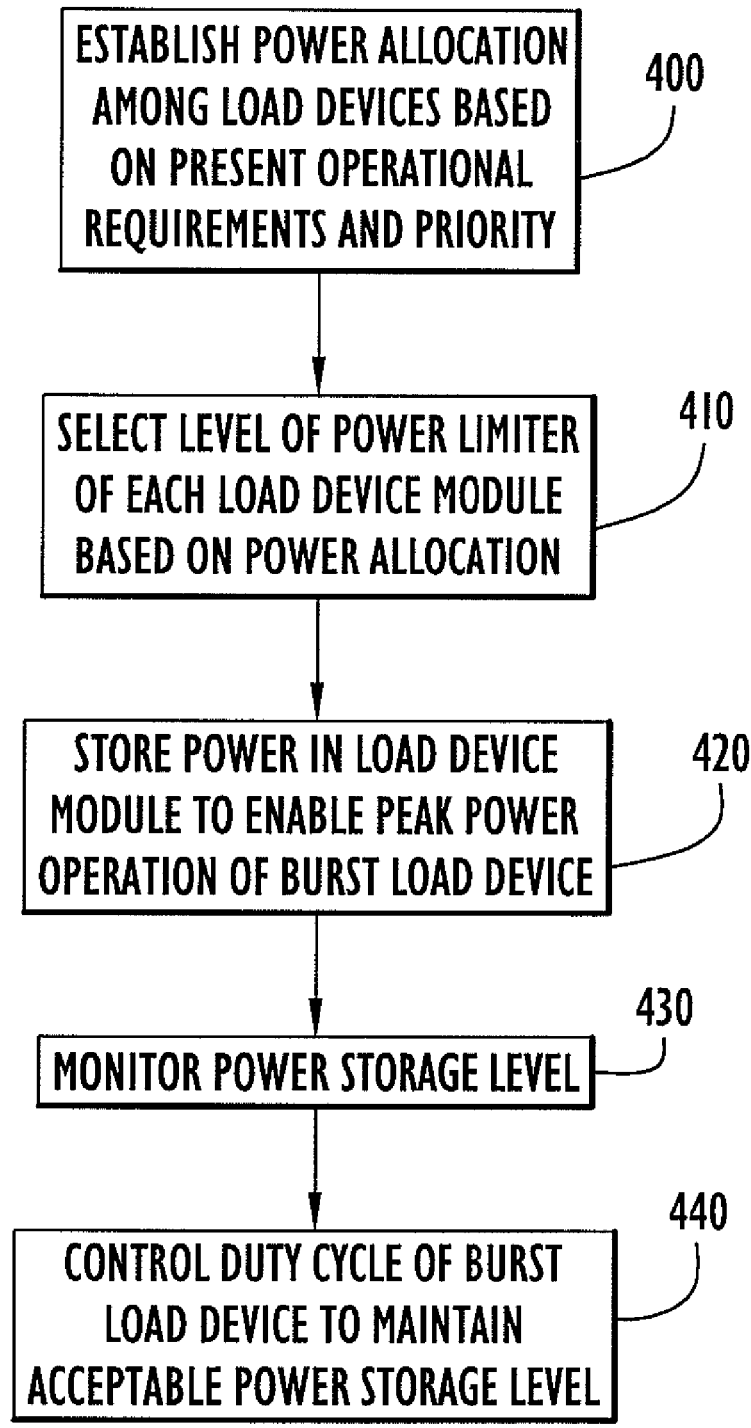
FIG. 4 is a flow chart illustrating operation of a shared power management system in accordance with an exemplary embodiment of the present invention.

The methodology of the shared power management scheme according to an exemplary embodiment of the invention is summarized in the flow chart of FIG. 4. The listed operations need not occur strictly in sequence and, in fact, would generally overlap and/or occur on an ongoing basis. In operation 400, a power allocation among the load devices is established based on present operational requirements and priority, such that load devices requiring more power and/or having priority over other load devices are allocated more of the overall power budget available from the shared power source. The power allocation is assessed on an ongoing basis, accounting for changes is operation, scheduling, and priority, for example.

The level of the power limiter of each load device module is selected in accordance with the power allocation of the associated load device (operation 410), such that the sum of the average power limits set in the power limiters of the load devices does not exceed the available power from the shared power source. Each power limit level can be adjusted in accordance with changes to the associated power allocation.

In operation 420, power is stored locally in the load device module and distributed to the load device to enable operation during burst periods at a peak power that exceeds the average power level limited by the power limiter. The local power storage (charge) level is monitored (operation 430) and can be used as feedback to control the duty cycle (or peak power) of the load device to maintain an acceptable power storage level to enable ongoing operation of the burst load device (operation 440).

Having described exemplary embodiments of a shared power management system, variations and changes will be suggested to those skilled in the art in view of the teachings set forth herein. It is therefore to be understood that all such variations, modifications and changes are believed to fall within the scope of the present invention as defined by the appended claims.

What is claimed:

1. An adaptive power management system, comprising:
a plurality of load devices including a burst load device configurable to operate with a time-varying load having a controllable duty cycle;
a shared power source configured to supply power to the plurality of load devices;
a power manager configured to adaptively determine a power allocation for the burst load device based on operational requirements of the plurality of load devices;
a multi-level power limiter configured to limit a maximum average power level supplied to the burst load device to one of a plurality of selectable average power levels in response to the power allocation determined by the power manager; and
a power storage module configured to store power supplied by the shared power source and to supply sufficient power to permit the burst load device to operate with a peak power that exceeds the maximum average power level during burst periods, wherein the power manager controls the duty cycle of the burst periods of the burst load device to maintain the power stored by the power storage module above a desired level.

2. The system of claim 1, wherein each of the plurality of load devices has a peak power requirement, and wherein a peak power available from the shared power source is less than the sum of the peak power requirements of the plurality of load devices.

3. The system of claim 1, wherein the power manager controls the duty cycle of the burst load device by controlling at least one of a duration and a repetition rate of the burst periods.

4. The system of claim 1, wherein the power storage module monitors a power storage state indicating a currently remaining amount of power in the power storage module, and wherein the power manager controls the duty cycle of the burst load device based on the power storage state.

5. The system of claim 1, wherein the power manager controls the duty cycle of the burst load device as a function of the power level controlled by the multi-level power limiter.

6. The system of claim 1, wherein the power manager, the multi-level power limiter, the power storage module, and the burst load device are components of a load device module.

7. The system of claim 1, wherein the power manager is coupled to each of the plurality of load devices having a time-varying load and controls duty cycles of burst periods of each of the load devices having a time-varying load.

8. The system of claim 1, wherein the power manager controls the peak power of the burst load device to maintain the power stored by the power storage module above the desired level.

9. An electronic device, comprising:
at least first and second load devices, the first load device being configurable to operate with a time-varying load having a controllable duty cycle;
a shared power source configured to supply power to the first and second load devices;
a power controller configured to adaptively determine a power allocation for the first load device based on operational requirements of the first and second load devices and configured to adaptively limit power supplied by the shared power source to the first load device to one of a plurality of selectable power levels based on the power allocation; and
a power storage module configured to store power supplied by the shared power source and to supply sufficient power to permit the first load device to operate during burst periods with a peak power that exceeds an average power supplied to the power storage module by the shared power source, wherein the power controller controls the duty cycle of the burst periods of the first load device to maintain the power stored by the power storage module above a desired level.

10. The device of claim 9, wherein the first and second load devices each have a peak power requirement, and wherein a peak power available from the shared power source is less than the sum of the peak power requirements of the first and second load devices.

11. The device of claim 9, wherein the power manager controls the duty cycle of the first load device by controlling at least one of a duration and a repetition rate of the burst periods.

12. The device of claim 9, wherein the power storage module monitors a power storage state indicating a currently remaining amount of power in the power storage module, and wherein the power manager controls the duty cycle of the first load device based on the power storage state.

13. The device of claim 9, wherein the power manager controls the duty cycle of the first load device as a function of the power level controlled by the multi-level power limiter.

14. The device of claim 9, wherein the power manager, the multi-level power limiter, the power storage module, and the first load device are components of a load device module.

15. The device of claim 9, wherein the power manager is coupled to each of the plurality of load devices having a time-varying load and controls duty cycles of burst periods of each of the load devices having a time-varying load.

16. The device of claim 9, wherein the power manager controls the peak power of the burst load device to maintain the power stored by the power storage module above the desired level.

17. A method of adaptively managing power supplied to a plurality of load devices by a shared power source, the load devices including a burst load device configurable to operate with a time-varying load having a controllable duty cycle, the method comprising:
  adaptively determining a power allocation for the burst load device based on operational requirements of the plurality of load devices;
  limiting power supplied by the shared power source to the first load device to one of a plurality of selectable power levels based on the power allocation;
  storing power supplied by the shared power source in a power storage device;
  supplying sufficient power from the power storage device to permit the burst load device to operate during burst periods with a peak power that exceeds the average power supplied to the storage device; and
  controlling the duty cycle of the burst periods of the burst load device to maintain the power stored by the power storage device above a desired level.

18. The method of claim 17, wherein each of the plurality of load devices has a peak power requirement, and wherein a peak power available from the shared power source is less than the sum of the peak power requirements of the plurality of load devices.

19. The method of claim 17, wherein the duty cycle of the burst load device is controlled by controlling at least one of a duration and a repetition rate of the burst periods.

20. The method of claim 17, further comprising:
  monitoring a power storage state indicating a currently remaining amount of stored, wherein the duty cycle of the burst mode device is controlled as a function of the power storage state.

21. The method of claim 17, wherein the duty cycle of the burst mode device is controlled as a function of a power level to which the burst load device is limited.

22. The method of claim 17, further comprising:
  controlling the peak power of the burst load device to maintain the power stored by the power storage module above the desired level.

23. An electronic device, comprising:
  at least first and second means for drawing power, the first means for drawing power being configurable to operate with a time-varying load having a controllable duty cycle;
  means for supplying power in a shared manner to the first and second means for drawing power;
  means for adaptively determining a power allocation for the first means for drawing power based on operational requirements of the first and second means for drawing power;
  means for adaptively limiting power supplied by the means for supplying power to the first means for drawing power to one of a plurality of selectable power levels based on the power allocation; and
  means for storing power supplied by the shared power source and for supplying sufficient power to permit the first means for drawing power to operate during burst periods with a peak power that exceeds an average power supplied to the means for storing power;
  and means for controlling the duty cycle of the burst periods of the first means for drawing power to maintain the power stored by the means for storing power above a desired level.

24. A program product apparatus having a computer readable medium with computer program logic recorded thereon for facilitating adaptive management of power supplied to a plurality of load devices by a shared power source, wherein at least one of load devices includes a burst load device configurable to operate with a time-varying load having a controllable duty cycle, and wherein a power storage device is configured to store power supplied by the shared power source and supply sufficient power to permit the burst load device to operate during burst periods with a peak power that exceeds the average power supplied to the storage device, the program product apparatus comprising:
  a module for adaptively determining a power allocation for the burst load device based on operational requirements of the plurality of load devices;
  a module for limiting power supplied by the shared power source to the first load device to one of a plurality of selectable power levels based on the power allocation; and
  a module for controlling the duty cycle of the burst periods of the burst load device to maintain the power stored by the power storage device above a desired level.

* * * * *